(12) United States Patent
Solovyov

(10) Patent No.: US 8,343,626 B2
(45) Date of Patent: Jan. 1, 2013

(54) DRY-COATED OXYGEN-SCAVENGING PARTICLES AND METHODS OF MAKING THEM

(75) Inventor: Stanislav E. Solovyov, Getzville, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 0 days.

(21) Appl. No.: 13/110,038

(22) Filed: May 18, 2011

(65) Prior Publication Data

US 2011/0218269 A1    Sep. 8, 2011

Related U.S. Application Data

(63) Continuation of application No. 11/161,053, filed on Jul. 21, 2005, now Pat. No. 7,951,419.

(51) Int. Cl.
*B32B 5/16* (2006.01)

(52) U.S. Cl. ........ 428/402; 428/403; 428/404; 428/405; 428/406; 428/407

(58) Field of Classification Search ........... 428/402–407
See application file for complete search history.

(56) References Cited

U.S. PATENT DOCUMENTS

| | | | |
|---|---|---|---|
| 5,688,852 A | 11/1997 | Misawa et al. | |
| 5,744,056 A | 4/1998 | Venkateshwaran et al. | |
| 5,885,481 A * | 3/1999 | Venkateshwaran et al. | 252/188.28 |
| 6,369,148 B2 | 4/2002 | Chiang et al. | |
| 6,586,514 B2 | 7/2003 | Chiang et al. | |
| 6,964,796 B1 | 11/2005 | Koyama et al. | |
| 7,951,419 B2 * | 5/2011 | Solovyov | 427/212 |
| 2003/0027912 A1 | 2/2003 | Tung et al. | |
| 2003/0039779 A1 | 2/2003 | Share et al. | |
| 2003/0040564 A1 | 2/2003 | Tung et al. | |
| 2003/0053927 A1 | 3/2003 | Drozd et al. | |
| 2003/0108702 A1 | 6/2003 | Tung et al. | |
| 2004/0037785 A1 | 2/2004 | Staniforth et al. | |
| 2004/0178386 A1 | 9/2004 | Tung et al. | |
| 2004/0185198 A1 | 9/2004 | Sisson et al. | |

FOREIGN PATENT DOCUMENTS

| | | |
|---|---|---|
| EP | 1 506 718 A1 | 2/2005 |
| EP | 1506718 A1 * | 2/2005 |
| JP | 11302706 A | 2/1999 |
| JP | 2005008598 A | 1/2005 |
| WO | 2005016762 A2 | 2/2005 |

OTHER PUBLICATIONS

Chinese Office Action dated Aug. 24, 2011 in corresponding Chinese Patent Application No. 20060034427.7 and English Translation provided by China Patent Agent (H.K.) Ltd.
Mechano Fusion System AMS, Process Technologies for Tomorrow® (2 pages), Jun. 2005.
Emma Petersson. Influence of crushing mechanism on the produced particle shape. Chemical Engineering, LTH, Lund University and Institute of Mechanical (4 pages), Mar. 2000.
Stedman, Micro-Max Fine Grind Air Swept Mill. 2 pages from Catalog No. 687. Stedman Machine Company, P.O. Box 299, Aurora, Indiana 47001, Jul. 2001.
Technical Channel. Article of the Week by Special Chem—Packaging Gets Active: Additives Lead the Way (6 pages)—http://www.specialchem4polymers.com/2456/eng/article.aspx?id=1719, Jun. 2004.
Solovyov et al. Theory of Transient Permeation Through Reactive Barrier Films, Parts I, II, and III, International Journal of Polymeric Materials 54, 2005 (pp. 71-139).

* cited by examiner

*Primary Examiner* — Leszek Kiliman
(74) *Attorney, Agent, or Firm* — Stephen B. Salai, Esq.; Paul A. Leipold, Esq.; Harter Secrest & Emery LLP

(57) ABSTRACT

A method of dry coating oxidizable particles with activating particles. The method includes accreting at least portions of the activating particles onto surfaces of the oxidizable particles by mechanically induced juxtapositions to form composite particles; and abrading the composite particles to more evenly distribute the activating component over surfaces of the activating particles.

32 Claims, 2 Drawing Sheets

DRY-COATED OXYGEN-SCAVENGING PARTICLES AND METHODS OF MAKING THEM

CROSS-REFERENCE TO RELATED APPLICATIONS

The present application is a continuation of currently pending U.S. patent application Ser. No. 11/161,053 filed Jul. 21, 2005, the entire disclosure of which is expressly incorporated by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

Suitably shaped thermoplastic polymers have been routinely used as packaging for products that degrade under normal environmental conditions. Thermoplastic polymer packaging provides a passive barrier to diffusive mass transport of oxygen, other atmospheric gases, water vapor, ethylene, and flavor and odor compounds through the packaging walls. Passive barriers are defined as being chemically inert to the permeating gasses. In comparison to metals and inorganic glasses, which provide nearly absolute gas barriers, thermoplastic polymers are more permeable to atmospheric gasses including oxygen, and such polymer barriers often do not provide sufficiently low oxygen transmission rates to satisfy manufacturers' expectations of product shelf life. In addition, passive barriers do not reduce oxygen initially present inside the package after sealing. Oxygen present inside the package or permeating through the packaging walls can accelerate oxidative, enzymatic, and other adverse biochemical reactions. Accordingly, many food and beverage manufacturers use preservatives and antioxidants in a packaged foodstuff to extend its shelf life. Consumers, however, increasingly find such additives undesirable.

Oxygen-absorbing materials have been placed inside the packaging to reduce oxygen levels inside sealed packages. The oxygen-absorbing materials can be arranged as separate packets (also known as a pouches or sachets) or as labels attached to the inside of the packages. Although oxygen-absorbing materials placed inside the packaging can reduce the amount of oxygen inside the packaging, the rate of oxygen ingress into the packaging through the packaging walls is not slowed by the presence of oxygen-absorbing materials within the packages.

However, oxygen-absorbing materials have also been incorporated into the polymer resin of the packaging walls to form active barriers to oxygen ingress. The polymer resin in the walls can be impregnated with so-called oxygen scavengers containing oxidizable substrates that undergo irreversible chemical reactions with oxygen. For example, the oxygen-scavenger particles can be manufactured as fine powders (particulates) that can be dispersed in a liquid polymer resin during the melt processing. The scavenger-loaded resin can then be processed into a packaging film or a container wall. The oxygen-scavenger particles incorporated into packaging walls form an active barrier to oxygen permeation that reduces rates of oxygen ingress into the package. In addition, the incorporated oxygen-scavenger particles can reduce both the amount of oxygen dissolved in the packaging walls and the amount of oxygen present inside the package.

Oxygen-scavenging powders can be formed from a mixture of an oxidizable metal (e.g., reduced iron powder) and an activating component promoting the reaction of the oxidizable metal with oxygen, often in the presence of water. Suitable activating components include: electrolytes (e.g., sodium chloride), acidifying components (e.g., ferrous sulfate), electrolytic acidifying components (e.g., sodium bisulfate), and protic solvent hydrolyzable halogen compounds (e.g., Lewis acids, such as aluminum chloride).

Reducing average particle size and mixing the oxidizable and activating components, e.g., using grinding and dry blending, are known to improve scavenging performance of the compositions. However, such methods also result in significant amounts of loose activating component particles lacking intimate contact with the oxidizable substrate. Such loose particles can act as nucleation centers promoting crystallization of semi-crystalline wall forming matrix polymers (such as HDPE, PP and PET). In addition, the random separation of the oxidizable components from the activating components reduces the efficiency of the oxidation reactions. As a consequence, high loadings of the oxidizable and activating components within the polymer resins may be needed to achieve the desired low oxygen transmission rate and high reactive capacity of the active barrier. The large number of loose particles, irregular particle morphologies, and the nucleating effects and subsequent crystallizations of the matrix polymer often lead to increased haze and reduced clarity of such active barriers.

Consumers of packaged food and beverage products generally prefer clear transparent packaging that allows visual evaluation of the product quality attributes such as consistency, texture, and color before purchase. Oxygen-scavenging blends incorporated into the walls of clear plastic containers can produce a haze or color brought on by a large number of small discrete particles of different chemical nature that are capable of scattering visible light. US Patent Application Publication Nos. 2003/0027912, 2003/0040564, and 2003/0108702 all of Tung et al., which are hereby incorporated by reference, discuss limiting the size and concentration of oxygen-absorbing particles to reduce haze.

Combining oxidizable component particles with activating component particles into heterogeneous entities greatly improves the efficiency of the oxygen-scavenging compositions and allows for reducing the total number of particles that must be loaded into film-forming polymers. The reduction in the number of particles can be achieved by attaching smaller activating component particles to larger oxidizable component particles. By controlling the initial particle size distribution of the components and the component weight ratios, the heterogeneous particle sizes of oxygen-scavenging composition can be kept below a limit of approximately 30 microns to 50 microns to avoid visual detection of such compositions as dark spots in the transparent polymer resin barrier.

U.S. Pat. No. 5,744,056 to Venkateshwaran et al., which is hereby incorporated by reference, discloses oxygen-scavenging compositions that exhibit improved oxygen-absorption efficiency by including more than one type of activating component. For example, a preferred composition includes both an electrolytic activating component and a non-electrolytic acidifying component. In the presence of moisture, the combination of the electrolytic and the acidifying components promotes the reactivity of metal with oxygen to a greater extent than either component alone.

These conventional scavenging compositions are typically created by dry blending the ingredients or by depositing the electrolytic and acidifying agents onto metal particles out of an aqueous liquid or slurry. European Patent Application Publication No. 1,506,718 entitled "Oxygen-scavenging Compositions and the Application thereof in Packaging Containers" and International Patent Application Publication WO 2005/016762 entitled "Oxygen-scavenging compositions and the application thereof in packaging and containers" both of Cobarr S.p.A. provide for depositing certain protic solvent hydrolyzable activating components onto oxidizable metal particles by dissolving the activating component into an essentially moisture free organic solution, contacting the solution with the oxidizable metal particle, and then removing the solvent. While depositing activating compounds from a liquid phase can achieve the desired intimacy of contact for unitary particles, liquid phase deposition presents several problems. First, the deposition leaves behind impurities of the solvent or reaction products of the salt with the solvent, referred to as adducts. These impurities can be bound into the composition. Second, the liquid phase deposition requires a dissolution step and a solvent removal step. Third, surface tension of the liquid can inhibit penetration of the liquid into the pores of metal particles. Fourth, the composition tends to be unstable during subsequent heat processing of the active barrier polymer.

Vapor streams have also been used to achieve intimate contact between oxidizable carrier components and activating guest components. For example, Japanese Application 10-131379 entitled "Iron Powder For Reactive Material and Its Production" provides for enveloping an iron powder with hot chlorine or hydrogen chloride gas for forming a ferric chloride coating on the surfaces of the iron powder. Although this vapor phase-solid phase reaction creates intimacy of contact, the reactions are limited to the reaction products of iron and a few gasses. Dissimilar components such as iron and salts of alkali and alkali earth metals cannot be combined by this technique.

Other processes involving sublimation and physical vapor deposition have also been used to combine oxidizable and activating components into heterogeneous oxygen-scavenging particles. For example, certain Lewis acids such as $AlCl_3$ and $AlBr_3$ can be vapor deposited onto iron particles. However, these techniques are limited to activating components with relatively low sublimation temperatures that allow for efficient vaporization and delivery of the activating component vapor to a continuously mixed iron powder without decomposing at these temperatures. Activating compositions that contain more than one activating component generally cannot be deposited in this way because of differences in sublimation temperatures of the components. Some components have excessively high temperatures of sublimation, and other components decompose before sublimation temperatures are reached. Unequal sublimation rates can also alter the final composition.

FIELD OF THE INVENTION

The invention relates to oxygen-scavenging particles and their methods of manufacture. Such oxygen-scavenging materials can be placed inside packaging or incorporated into the packaging itself for such purposes as reducing oxygen present inside the packaging or actively inhibiting oxygen permeation through the packaging.

BRIEF SUMMARY OF THE INVENTION

The invention relates to the manufacture of heterogeneous oxygen-scavenging particles by dry-coating techniques applicable to a wide range of particles and particle combinations. One or more activating component particles can be coated onto the surface of an oxidizable component particle to form a single oxygen-scavenging particle without the use of solvents, surface vapor reactions, or physical vapor depositions. The preferred dry-coating techniques preserve the initial weight fraction and mixture composition of oxidizing and activating component particles, which allows for optimizing the formulation of the activator system without the problems related to insufficient and unequal solubility of activating components, drying and solvent recovery, uniform sublimation, and vapor deposition of sublimable compounds. The activating components can include materials for hiding color changes, referred to as blooms, which accompany the desired oxidation reactions. Other materials that can be similarly dry coated onto the oxygen-scavenging particles include binders and water absorbers, activator component stabilizers, and prehydrated moisture sources.

The preferred dry-coating techniques reduce the number of particles in a given oxygen-scavenging composition by intimately joining the activating component particles to the oxidizable particles. The coated particles can be incorporated into polymer packaging walls in lower concentrations to reduce or eliminate a haze while providing the desired active barrier to oxygen ingress. The dry-coated compositions within packaging walls can provide rapidly responsive systems that remain dormant until activated by moisture diffusion from an aqueous liquid product or from a high water activity product sealed within the packaging.

One version of the invention as a method of manufacturing a batch of oxygen-scavenging particles includes mixing oxidizable component particles together with activating component particles to form a mixture. Compression applied to the mixture of oxidizable and activating component particles forces collisions between the different particle components for attaching the activating component particles to surfaces of the oxidizable component particles. The mixture of oxidizable and activating component particles also undergoes shearing to remove irregular accretions of the activating component on the surfaces of the oxidizable component particles. The steps of mixing, compressing, and shearing the mixture of oxidizable and activating component particles is repeated, preferably in a cyclical manner, to more evenly coat the surfaces of the oxidizable component particles with the activating component.

The oxidizable component particles have a mean diameter, and the step of compressing preferably includes compacting the mixture to a thickness equal to a multiple of the mean diameter of the oxidizable component particles. Preferably, the mixture is pre-compacted to a first thickness before the mixture is compressed to a more compacted state at a second smaller thickness. The mixture is preferably sheared in the more compacted state at the second smaller thickness.

The method works best if the oxidizing and activating component particles have substantially different hardnesses, and the collisions between the different particle components deform at least one of the component particles. For example, the oxidizable component particles can be made of a ductile material having a hardness substantially less than the activating component particles. Then, the harder particles can be embedded into the surfaces of the more ductile particles by application of mechanical forces. When the activating component particles are softer or prone to impact cracking and breakup, application of compressive and shearing forces transferred by the larger oxidizable particles can reduce the mean size of the activating component particles and thus provide for a more uniform coating. In addition, the oxidizable component particles can have a mean diameter substantially larger than a mean diameter of the activating component particles. Preferably, the mean diameter of the oxidizable component particles is approximately five to ten times larger than the mean diameter of the activating component particles.

The oxidizable component particles can be made of an oxidizable metal or metal alloy. For example, the oxidizable component particles can include a metal selected from a group of metals consisting of iron, aluminum, copper, zinc, manganese, and magnesium. The activating component particles preferably include at least one of electrolytic component particles, acidifying component particles, and protic solvent hydrolyzable component particles and can take a variety of molecular forms including crystalline or amorphous arrangements. For example, the activating component particles can contain at least one of a halide, a hydrolysable halogen compound, a sulfate, and a bisulfate.

The step of shearing preferably includes entrapping the mixture between relatively moving elements for imparting differential motion between layers of the entrapped mixture. For example, the mixture can be entrapped between a relatively rotating pestle and drum. The two relatively moving elements are preferably spaced apart through a distance of at least one millimeter and the oxidizable component particles have a mean diameter less than 50 microns.

Another version of the invention as a method of dry coating oxidizable particles with activating particles includes accreting at least portions of the activating particles onto surfaces of the oxidizable particles by mechanically induced juxtapositions to form composite particles. The composite particles are abraded to more evenly distribute the activating component over surfaces of the activating particles.

In preparation for the step of accreting, the oxidizable particles are preferably together with the activating particles in a solid particulate mixture. The step of accreting preferably includes applying mechanical forces to the solid particulate mixture to relatively move the activating particles into contact with the oxidizable particles. The mechanical forces can be applied by compressing the solid particulate mixture. However, the mixture is preferably pre-compacted to a first thickness, which is compressed for further compacting the solid particulate mixture to a second smaller thickness. Preferably, the second thickness is a multiple of at least 100 times a mean diameter of the oxidizable particles.

The step of abrading preferably includes applying mechanical shear across the solid particulate mixture to affect different relative motions among the particles. Relative rotations are preferable among the motions imparted to the particles.

The steps of blending, accreting, and abrading are preferably repeated in succession through a plurality of cycles. For 100 to 200 liter machines, cycle rates of at least 1000 times per minute are preferred with cycle rates between 1400 and 6000 times per minute more preferred. Generally, the cycle rates are adjusted to optimize a desired energy per unit weight of the powder mixture and shear rate. Each of the cycles provides for progressively accreting at least portions of the activating particles on different areas of the surfaces of the oxidizable particles.

The step of abrading can remove irregular accretions of the activating component on the surfaces of the oxidizable component particles. The accretions preferably include coating optically masking component particles together with the activating component particles onto the surfaces of the oxidizable particles by mechanically induced juxtapositions to form the composite particles. The composite particles are preferably abraded to more evenly distribute both the activating component and the optically masking component over surfaces of the oxidizable particles.

Another version of the invention as a batch of composite oxygen-scavenging particles that react with oxygen in the presence of liquid phase water or water vapor include oxidizable component particles dry coated with activating component particles by mechanically-induced juxtapositions. The coated particles are mechanically abraded while continuing to be dry coated in different mechanically-induced juxtapositions for reducing irregularities within the activating component coating.

The oxidizable component particles are preferably made of an oxidizable metal or an alloy of such metals. For example, the oxidizable metal or an alloy of such metals selected from the group consisting of iron, aluminum, copper, zinc, manganese, and magnesium. The activating component particles preferably include at least one of electrolytic component particles, acidifying component particles, and protic solvent hydrolyzable component particles. For example, the activating component particles are formed from one of a halide, a metal halide, a protic solvent hydrolyzable halogen compound, a sulfate, a bisulfate, a hydrated metal sulfate and/or bisulfate complex, a ferrous sulfate monohydrate. The activating component particles can also be formed from one of $AlCl_3$, $AlBr_3$, $FeCl_2$ and $FeCl_3$.

The oxidizable component particles and the activating component particles are preferred to have substantially different hardnesses. For example, the oxidizable component particles preferably have a hardness substantially less than the activating component particles. Preferably, a mean particle diameter of the oxidizable component particles is substantially larger than a mean particle diameter of the activating component particles. The mean particle diameter of the oxidizable component particles can be approximately five to ten times larger than the mean particle diameter of the activating component particles. For example, the mean particle diameter of the oxidizable component particles is preferably between 1 micron and 50 microns and more preferably between 5 microns to 15 microns. In contrast, the mean article diameter of the activating component particles is preferably between 0.1 microns and 5 microns and more preferably between 0.2 microns and 3 microns. The activating component particles preferably comprise 2 percent to 15 percent by weight of the batch and more preferably comprise 4 percent to 10 percent by weight of the batch.

Optically masking component particles can be similarly dry coated onto the oxidizable component particles by mechanically-induced juxtapositions for forming the composite particles that are subject to abrasion. The dry-coated optically-masking component particles, such as aluminum chloride that can form nearly colorless aluminum oxide and aluminum hydroxide in the reaction of substitution of chloride anion by oxygen or hydroxyl group upon $AlCl_3$ hydrolysis by water, can eliminate or reduce the visual appearance of blooming of metal oxides formed as a result of oxygen-scavenging processes.

Another version of the invention as an oxygen-scavenging masterbatch includes (a) composite oxygen-scavenging particles formed by oxidizable component particles dry coated with an activating component and (b) a base polymer forming a matrix for embedding the oxygen-scavenging particles. The combination of the embedded composite oxygen-scavenging particles and the base polymer takes the form of a plurality of solid concentrates in which the composite oxygen-scavenging particles have a higher loading fraction within the base polymer than necessary for its intended use, such as an active barrier. The masterbatch can be later diluted with a neat polymer or blended with a similar polymer to achieve a desired a loading level. The subsequent polymer-to-polymer blending assures optimum dispersions and formulations without requiring the handling of fine powders by converters or other subsequent processors.

The composite oxygen-scavenging particles preferably occupy between 5 percent and 25 percent by weight of the solid concentrates and are preferably embedded within the base polymer matrix by blending the composite oxygen-scavenging particles in a liquid state of the base polymer and re-solidifying the base polymer. The base polymer is preferably a thermoplastic resin. The oxidizable component particles are preferably made of an oxidizable metal or an alloy of such metals. The activating component preferably includes at least one of electrolytic component particles, acidifying component particles, and protic solvent hydrolyzable component particles.

The invention can also be practiced as method of forming an active barrier to oxygen permeation using such a masterbatch. A batch of composite oxygen-scavenging particles is embedded within a matrix of a base polymer at a first concentration and transformed into a plurality of solid concentrates, forming the masterbatch. The solid concentrates of the masterbatch are mixed together with other solid concentrates of a polymer, and the mixture of solid concentrates is transformed into a barrier layer in which the composite oxygen-scavenging particles are embedded within the barrier layer in a second lower concentration.

The first concentration of the composite oxygen-scavenging particles is preferably between 5 percent and 25 percent by weight and more preferably around 10 percent by weight. The second concentration of the composite oxygen-scavenging particles is preferably less than 2 percent by weight and more preferably between 0.2 and 1 percent by weight.

The batch of composite oxygen-scavenging particles is preferably formed by dry coating oxidizable component particles with an activating component particle. The dry coating is preferably performed by mechanically induced juxtapositions between the oxidizable component particles and the activating component particles and includes mechanically abrading the composite oxygen-scavenging particles with each other.

BRIEF DESCRIPTION OF THE SEVERAL VIEWS OF THE DRAWING(S)

DETAILED DESCRIPTION OF THE INVENTION

Figure 1:
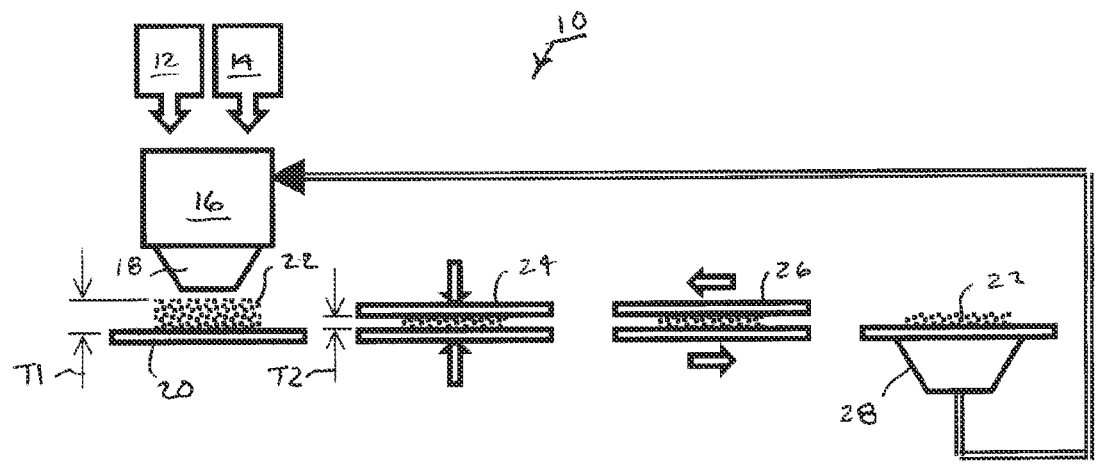
FIG. 1 is a diagram schematically depicting steps of the preferred dry-coating process.

The preferred oxygen-scavenging particles made in accordance with the invention have high oxygen-scavenging efficiency in presence of a protic solvent such as dissolved or liquid phase water in direct contact with the particles. The preferred particles preferably comprise oxidizable metals, particularly elemental iron or aluminum and their alloys, and at least one or preferably more activating components. The activating components initiate or otherwise promote the reaction of the oxidizable metals with oxygen.

In many instances, particle reactivity is preferably initiated by water contact. The associated activating components only promote the oxidation reaction in the presence of moisture, which can arise from direct contact with a liquid or absorption from surrounding air or vapor. Moisture arises from a packaged food product having sufficiently high water activity. For example, when the preferred oxygen-scavenging particles are loaded into container walls made from a thermoplastic polymer, the scavenging particles remain essentially dormant until water from the packaged goods migrates to the container walls initiating a reaction with molecular oxygen diffusing through the walls toward the inside of the container.

Activating components whose activities are initiated in the presence of water include water-soluble electrolytes, water-soluble acidifying electrolytes, mixtures of water-soluble electrolytes and acidifying agents, and protic solvent hydrolyzable compounds. The ability of the activating component to initiate the oxygen-scavenging reaction depends largely on the acidity and electrolytic strengths of the hydrolysis products. U.S. Pat. No. 5,885,481 to Venkateshwaran et al., which is hereby incorporated by reference, describes advantages of using a non-halogenated acidifying electrolytic component. When water comes into contact with an acidifying agent such as $FeSO_4$ or with a protic solvent hydrolyzable compound such as $AlCl_3$, strong acids $H_2SO_4$ and $HCl$, respectively, are formed. In combination with additional electrolytes, such as for example $NaCl$ and $NaHSO_4$, rapid and efficient electron transfer from oxidizable metals to acidic groups is believed to occur, thus greatly accelerating oxidation of the metals and providing rapid scavenging of oxygen dissolved in the polymer matrix.

In other instances, the oxygen-scavenging particles are made to react immediately upon contact with free molecular oxygen. The associated activating components promote the reaction of the oxidizable metals immediately upon contact with free oxygen by incorporating water in the formulation of the activating components, such as by using moisture adsorbents saturated with water or by adding hydrated salt complexes.

The preferred activating components, whether operable by external or internal sources of water, intimately contact oxidizable metal substrates to form unitary oxygen-scavenging particles without the use of solvents, gas phase reactions, or vapor depositions. The contact is achieved through a dry-coating process initiated by mechanical motion.

FIG. 1 contains a diagram of a dry-coating system 10 depicting various steps of the preferred dry-coating process. Supplies of oxidizable component particles 12 and activating component particles 14 are added to a mixer 16, where the component particles are blended together, portioned, and then deposited through an applicator 18 onto a pre-compactor 20. The deposited particles 22 form a pre-compacted layer having a first thickness Ti. A compressor 24 further compacts the deposited particles 22 to a smaller second thickness T2 to force collisions between the different particle components 12 and 14 for attaching the activating component particles 14 to surfaces of the oxidizable component particles 12. The second thickness T2 is preferably at least one millimeter but is more preferably five to six millimeters, which can be 100 to 1000 or more times the mean diameters of the component particles 12. A shearer 26 forces other collisions and rolling motions among the particles 22 to remove irregular accretions of the activating component 14 on the surfaces of the oxidizable component particles 12. A recirculator 28 collects the mixture of partially coated particles 22 and returns them to the mixer 16, where the particles are re-blended and re-portioned, before being re-deposited through the applicator 18 onto the pre-compactor 20. Each cycle through the dry-coating system 10 provides for more evenly coating the surfaces of the oxidizable component particles 12 with the activating component 14.

One machine adaptable for carrying out the steps of the dry-coating system 10 is a so-called "Mechano Fusion System" available from the Hosokawa Micron Group of 10 Chatham Road, Summit, N.J. The machine includes two stationary pestles and a rotating drum. A particle mix is deposited onto the drum and precompressed by centrifugal forces produced by the drum rotation. The pestles include inclined surfaces that compress the deposited particles to a reduced thickness, while the continuous rotation of the drum generates a shear between the remaining pestle surfaces and the drum. Layers of the particles closest to the stationary pestles are relatively slowed in comparison to layers of the particles closest to the rotating drum. Scrapers angularly follow the pestles to remove the compressed and relatively sheared particles from the drum and return the particles to an applicator for re-blending and returning the particles to the drum.

Figure 2:
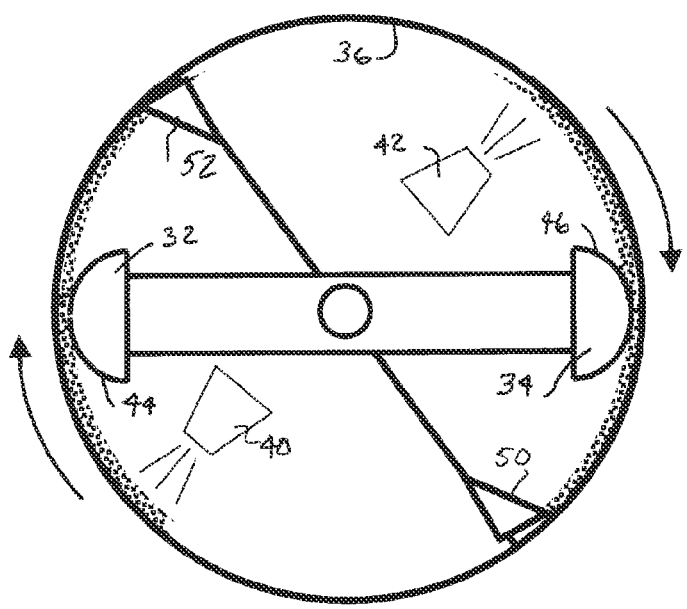
FIG. 2 is a view of a dry-coating system in which compound powders are compressed and sheared between a pair of pestles and a rotating drum.

FIG. 2 shows a diagram of two pestles 32 and 34 operating on particles 36 deposited on a rotary drum 38. Applicators 40 and 42 deposit the particles 36 on the rotating drum 38, which pre-compacts the particles 36 to the first thickness Ti under the influence of centrifugal force. Leading edges 44 and 46 of the pestles 32 and 34 compress the rotationally advancing particles 36 to the second thickness T2. The continuing relative rotation between the pestles 32 and 34 and the drum 38 shears the further compacted layers of the particles 38. Together, the compression and shear generated by the relative motion between the pestles 32 and 34 and the drum 30 force the different component (i.e., oxidizable and activating) particles together as coated particles and relatively move the particles with respect to each other to remove irregular accumulations of the activating particles on the oxidizable particles. Scraper blades 50 and 52 remove the compressed and sheared particles from the drum 38 and return the particles through a mixer (not shown) to the applicators 40 and 42.

The preferred dry-coating process preferably includes a three-dimensional recirculation of dry powders based on a premix of oxidizable and activating component particles. The dry powders are repeatedly squeezed into a gap between the pestles 32 and 34 and the drum 36, compressed to a reduced thickness, sheared within the gap, and remixed all at a high RPM (e.g., 1200 RPM). The term "dry powder" is not intended to mean a powder completely free of moisture or solvents but rather it denotes any powdered material that is not a part of a solution, slurry or paste. As such, the "dry powder" does not incorporate any free solvents but it may include any hydrated or other solvent complexes of components existing in or reduced to a powder form.

Figure 3A:
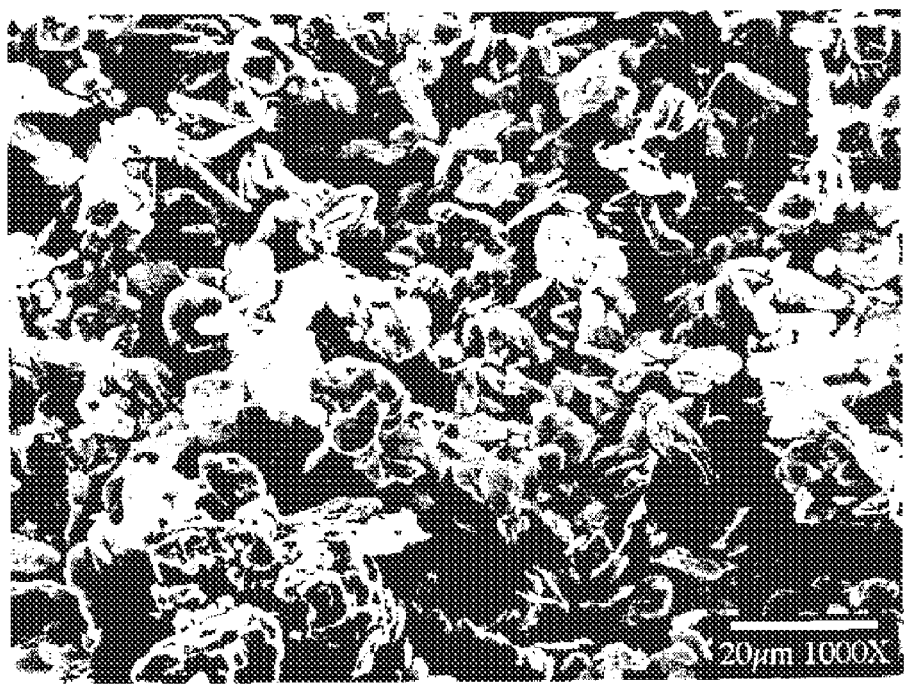
FIG. 3A is a greatly enlarged image of an uncoated iron powder.
Figure 3B:
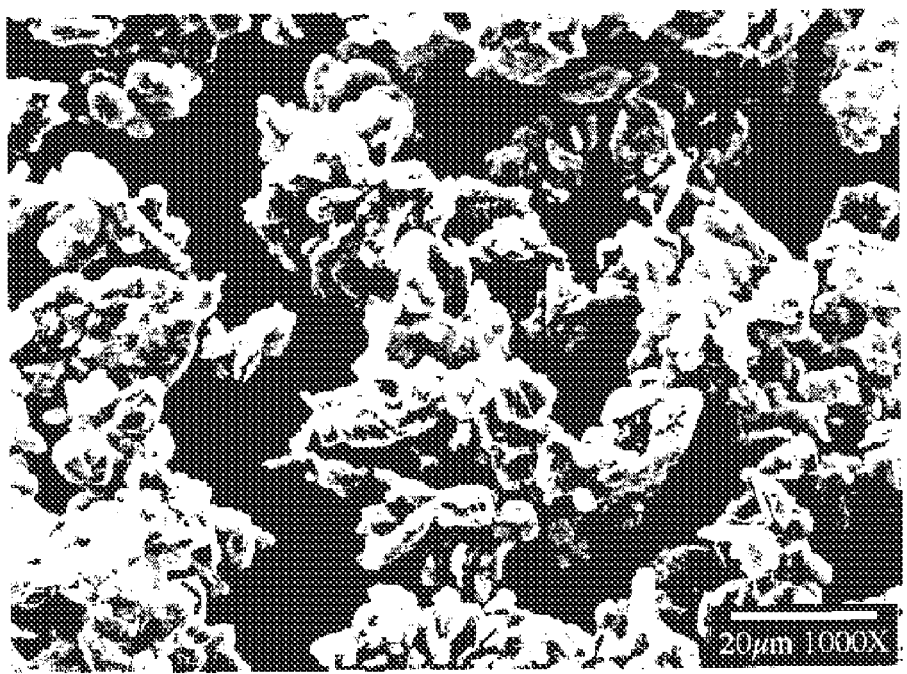
FIG. 3B is a greatly enlarged image of a dry-coated iron powder.

FIGS. 3A and 3B contrast similarly magnified views of an iron powder and an iron powder coated with an activating agent in accordance with the invention. In FIG. 3B, smaller-sized activating particles are shown fused onto and coating the surface of the larger iron particles. The coated particles show good uniformity and approach a spherical shape.

The dry-coating process is preferably a single unit operation. Powders of oxidizable and activating components are loaded into a machine, which is subsequently flushed with inert gas such as nitrogen or argon during the process. Alternatively, the process can be performed under vacuum. In both cases, the working environment avoids premature activation of the scavenging composition in the presence of ambient oxygen and humidity. The oxidizable and activating components can be premixed in a separate step before the coating step. The coating uniformity can be controlled by adjusting the running time of the machine, energy input per unit weight of loaded powders (RPM and compression gap), volume ratio of coating-to-coated particles, and the total volumetric loading of mixed powders as compared to the coating chamber volume to allow for efficient circulation and remixing of the powders in the machine before a next cycle.

The activating particles preferably have a mean particle size at least several times smaller than the oxidizable particles. The smaller activating particles attach to the larger oxidizable particles by various mechanisms including mechanically adhering to preexisting surface nonuniformities and to surface nonuniformities mechanically created during the process. High temperatures generated by friction at the powder contact points can also cause rapid melting and recrystallization of lower-melting-temperature activating components, resulting in increased contact area between recrystallized activating components and a higher adhesive strength of the coating. The larger exposed surface areas of the oxidizable particles are believed to cause preferential compaction and accretion of the smaller activating component particles on such available surfaces.

The underlying activator coating layers can be bonded to the oxidizable particles by various means in addition to mechanical entrapment, such as by electrostatic interactions between charged ions and van der Waals forces between permanent and induced dipoles of electrically neutral components without forming covalent bonds. Overlying coating layers of activating components not in direct contact with the oxidizable substrate form compacted accretions of smaller particles held together by electrostatic and van der Waals forces.

The mean particle size of activating coating particles is preferably at least 5-10 times smaller than the mean particle size of the oxidizable coated particles to provide for efficient accretion. Higher than 10 to 1 coated-to-coating particle size ratios are expected to result in higher uniformity coatings. The relative motions between the particles, which are responsible for moving the activating component particles into intimate contact with the oxidizable component particles, also have the effect of abrading the coated particles and producing rounder shapes. Such round-shaped particles are known to result in lower haze in polymeric films than irregularly-shaped particles with multiple facets.

The coating of the activating component particles onto the oxidizable component particles creates discrete heterogeneous particles containing both components. These composite scavenging particles can then be mixed into a polymer matrix by any of the known techniques, such as, for example, dispersing the particles into a polymer liquid via a liquid melt reactor or an extruder, or dispersing the particles into the polymer during an injection molding or extrusion of a packaging article. The composite particles can also be dispersed in a polymer using a higher loading fraction than necessary for successful active barrier applications, thus producing a polymer masterbatch. Such masterbatch can be further diluted with a neat polymer in the subsequent melt processing steps to achieve the desired loading level, reactivity, and reactive capacity of the scavenging composition to remove permeating oxygen. For example, a loading fraction of approximately 5 percent to 25 percent by weight, and preferably 10 percent by weight, can be extruded into pellets, which can be later diluted to loadings of approximately 1 percent by weight for forming active barrier walls.

For example, an oxygen-scavenging masterbatch can be formed by coating oxidizable component particles with an activating component to form a batch of composite oxygen-scavenging particles as described above and by embedding the batch of oxygen-scavenging particles within a matrix of a base polymer at a concentration higher than required for its intended use. The base polymer embedded with the oxygen-scavenging particles is transformed into a plurality of solid concentrates, which can function as a masterbatch.

For purposes of embedding the composite oxygen-scavenging particles, the composite oxygen-scavenging particles can be blended together with the base polymer while the base polymer is in a liquid state. Extruding the blended base polymer into a succession of pellets or other granules can solidify the blended base polymer into the plurality of solid concentrates. The composite oxygen-scavenging particles formed from coated metal or metal alloys are compatible with most polymers, and can be embedded within base polymers of a masterbatch that are the same or similar to the polymers intended for forming the active barriers.

An active barrier to oxygen permeation can be formed exploiting a masterbatch by first embedding a batch of composite oxygen-scavenging particles within a matrix of a base polymer at a first concentration and transforming the base polymer embedded with the composite oxygen-scavenging particles into a plurality of solid concentrates. The solid concentrates can be mixed together with other solid concentrates of the same or a compatible polymer, such as polyethylene terephthalate (PET), polyamide, or high-density polyethylene (HDPE). The mixture of solid concentrates can be transformed into a barrier layer in which the composite oxygen-scavenging particles are embedded within the barrier layer in a second lower concentration. A variety of conventional processing techniques can be used for this purpose, including injection molding, blow molding, and sheet or film extrusion.

The first concentration of the composite oxygen-scavenging particles is between 5 percent and 25 percent by weight and more preferably approximately 10 percent by weight. The second concentration of the composite oxygen-scavenging particles is preferably less than 2 percent by weight and more preferably between 0.2 and 1 percent by weight.

A preferred embodiment of this invention as a batch of oxygen-scavenging particles involves coating a reduced iron powder or an iron alloy powder with the mixture of powdered solid electrolytes (such as sodium chloride), acidifying components (such as ferrous sulfate), electrolytic acidifying components (such as sodium bisulfate), and protic solvent hydrolyzable halogen compounds (Lewis acid such as aluminum chloride). The oxidizable powder is preferred to have a mean particle size within 1-50 microns and in a most preferred embodiment within 5-15 microns. Based on the mean size of iron powder, the mean particle size of activating components is preferred to be in the range of 0.1-5 microns and in most preferred embodiment within 0.2-3 microns. The suitable particle size distributions of iron powder and the activating component powders are attained by known particle size reduction and classification techniques. The total weight fraction of activating components in the formulation is preferred to be within 2 percent to 15 percent by weight, with the most preferred embodiment to be within 4 percent and 10 percent by weight.

The compositions of both the oxidizable and activating components can vary between applications. The choice of components and their relative weight fractions can be optimized for specific film-forming polymers, their water and oxygen transport properties, aesthetic packaging requirements, the packaged product sensitivity to oxygen, and the water activity of the packaged product. The mean particle size of the oxygen-scavenging particles is preferably below a size allowing visual detection of oxygen-scavenging particles in a transparent film-forming polymer yet above a size that causes significant visible light scattering and loss of polymer clarity and transparency. The more efficient coating of the oxidizable metal substrates also allows for a decrease in the activating component weight fraction in the formulation, thus increasing scavenging reactive capacity of such oxygen-scavenging particles.

Another particular example of a coating mix includes NaCl (sodium chloride) at 2 percent to 3 percent by weight and AlCl3 (aluminum chloride) at 4 percent to 5 percent by weight combined with Fe (iron) at the remaining 92 percent to 94 percent by weight. The mean particle size of the sodium chloride powder is 1 to 2 microns, and the mean particle size of the iron powder is 10 microns. The aluminum chloride powder is a soft −40 mesh 99+% pure powder that melts and recrystallizes on the iron during the coating process (i.e., the compressing and shearing operations).

Such a coating mixture can be added to a Hosokawa Mechano Fusion System 100L machine in the following proportions:
  230 kilograms of iron
  12.2 kilograms of $AlCl_3$
  7.8 kilograms of NaCl The 100-liter machine is operated at 80 kW and 1000 to 1200 RPM for a period of approximately 3 hours. The iron particles tend to collectively coat until the loose salts are substantially exhausted and substantially cover the entire peripheries of the iron particles.

Additional agents such as binders and moisture absorbers preloaded with water can be placed on the oxidizable particles first before subjecting the oxidizable particles to the dry-coating process. For example, hydrated salt complexes can be placed in direct contact with or coated onto iron particles before dry coating. Alternatively, such compounds can be included in the activator formulation at an appropriately reduced size and dry-coated onto the oxidizable particles using the above-described dry-coating process. The different activating components can be dry-coated in succession to optimize the reactivity and aesthetic properties of oxygen-scavenging particles, or the different activating components can be dry-coated together onto the oxidizable particles. By adjusting weight ratios and particle size distributions of dry activator powders using known classification techniques and evaluating the coated powder after the dry-coating process to remove fine fractions of the activating components, the desired coating composition can be attained. In the preferred embodiment of the invention, substantially all of the loaded activating component particles are coated onto the oxidizable particles, thus eliminating the need to remove fine fractions of the activator components after the coating process is complete.

Different or even more than one oxidizable component can be dry-coated to achieve oxygen-scavenging goals. Mixes involving different oxidizable components or activator coatings can be used to meet otherwise disparate goals such as providing immediate oxygen-scavenging capabilities while deferring further capability until moisture is present.

Although the invention has been described with respect to specific embodiments, many process and composition variations will become apparent to those skilled in the art based on the overall teaching of the invention.

The invention claimed is:

1. A batch of composite oxygen-scavenging particles that react with oxygen in the presence of liquid phase water or water vapor, comprising:
   (a) oxidizable component particles being dry coated with activating component particles by mechanical force forming composite particles; and (b) the composite particles being mechanically abraded while continuing to be dry coated by mechanical forces for reducing irregularities within the activating component coating wherein said activating component particles comprises halide.

2. The batch of claim 1 in which the oxidizable component particles are made of an oxidizable metal or an alloy of such metals.

3. The batch of claim 2 in which the oxidizable metal or an alloy of such metals selected from the group consisting of iron, aluminum, copper, zinc, manganese, and magnesium.

4. The batch of claim 2 in which the activating component particles include at least one of electrolytic component particles, acidifying component particles, and protic solvent hydrolyzable component particles.

5. The batch of claim 2 in which the activating component particles are formed from at least one of, metal halide, a protic solvent hydrolyzable halogen compound, a sulfate, a bisulfate, a hydrated metal sulfate and/or bisulfate complex, and a ferrous sulfate monohydrate.

6. The batch of claim 2 in which the activating component particles are formed from $NaHSO_4$.

7. The batch of claim 1 in which the oxidizable component particles have a hardness substantially less than the activating component particles.

8. The batch of claim 2 in which the oxidizable component particles have a mean particle diameter substantially larger than a mean particle diameter of the activating component particles.

9. The batch of claim 8 in which the mean particle diameter of the oxidizable component particles is approximately five to ten times larger than the mean particle diameter of the activating component particles.

10. The batch of claim 9 in which the mean particle diameter of the oxidizable component particles is between 1 micron and 50 microns.

11. The batch of claim 9 in which the mean particle diameter of the oxidizable component particles is between 5 microns and 15 microns.

12. The batch of claim 9 in which the mean particle diameter of the activating component particles is between 0.1 microns and 5 microns.

13. The batch of claim 9 in which the mean particle diameter of the activating component particles is between 0.2 microns and 3 microns.

14. The batch of claim 2 in which the activating component particles comprise 2 percent to 15 percent by weight of the batch.

15. The batch of claim 2 in which the activating component particles comprise 4 percent to 10 percent by weight of the batch.

16. The batch of claim 2 further comprising optically masking component particles that are dry coated onto the oxidizable component particles by mechanically-induced juxtapositions for forming the composite particles that are subject to abrasion.

17. The batch of claim 2 in which the activating component particles include at least two different kinds of particles.

18. The batch of claim 17 in which one of the activating component particles is an electrolytic component particle and a second of the activating component particles is an acidifying component particle.

19. The batch of claim 18 in which a third activating component particle masks color changes accompanying oxidation of the oxidizable component particles.

20. An oxygen-scavenging masterbatch, comprising:
(a) composite oxygen-scavenging particles including oxidizable component particles dry coated with an activating component;
(b) a base polymer forming a matrix for embedding the oxygen-scavenging particles;
(c) the composite oxygen-scavenging particles being embedded within the matrix of the base polymer, together forming a plurality of solid concentrates; and
(d) the composite oxygen-scavenging particles occupying at least five percent by weight of solid concentrates; wherein the activating component comprises a halide and wherein oxidizable component particles are dry coated with the activating component in a particle form.

21. The masterbatch of claim 20 in which the composite oxygen-scavenging particles are embedded within the matrix of the base polymer by blending the composite oxygen-scavenging particles in a liquid state of the base polymer and re-solidifying the base polymer.

22. The masterbatch of claim 20 in which the base polymer is a thermoplastic resin.

23. The masterbatch of claim 21 in which the composite oxygen-scavenging particles occupy between 5 percent and 25 percent by weight of solid concentrates.

24. The masterbatch of claim 21 in which the solid concentrates have a granular form.

25. The masterbatch of claim 21 in which oxidizable component particles are dry coated with the activating component particles by mechanically-induced juxtapositions forming the composite particles.

26. The masterbatch of claim 21 in which the composite particles are mechanically abraded while being dry coated in different mechanically-induced juxtapositions for reducing irregularities within the activating component coating.

27. The masterbatch of claim 26 in which the oxidizable component particles are made of an oxidizable metal or an alloy of such metals.

28. The masterbatch of claim 21 in which the activating component particles include at least one of electrolytic component particles, acidifying component particles, and protic solvent hydrolyzable component particles.

29. The masterbatch of claim 21 in which the oxidizable component particles and the activating component particles have substantially different hardnesses.

30. The masterbatch of claim 21 in which the oxidizable component particles have a mean particle diameter substantially larger than a mean particle diameter of the activating component particles.

31. The masterbatch of claim 21 in which the activating component particles comprise 2 percent to 15 percent by weight of the composite oxygen-scavenging particles.

32. The masterbatch of claim 31 wherein the activating component particles comprise component particles that mask color changes accompanying oxidation of the oxidizable component particles.

* * * * *